United States Patent Office 3,334,302
Patented Aug. 1, 1967

3,334,302
DICYCLIC SULFONYLUREA COMPOUNDS
Laszlo G. Beregi, Boulogne-sur-Seine, and Pierre J. Hugon, Rueil-Malmaison, Seine-et-Oise, France, assignors to Société en nom collectif dite: "Science Union et Cie Societe Francaise de Recherche Medicale," Suresnes, Seine, France, a corporation of France
No Drawing. Filed June 28, 1963, Ser. No. 291,244
Claims priority, application Great Britain, July 2, 1962, 25,241/62
13 Claims. (Cl. 260—397.7)

This invention relates to novel dicyclic derivatives, salts thereof, and methods of preparing same.

The novel compounds to which the invention relates may be represented by the formula

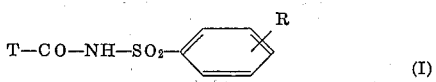
(I)

wherein:

R is a substituent selected from within the group consisting of a halogen atom, a lower alkyl radical containing from 2 to 4 carbon atoms, a lower alkoxy radical containing from 1 to 5 carbon atoms, amino radical and an acetyl radical.

T is a dicyclo-derivative of the formula

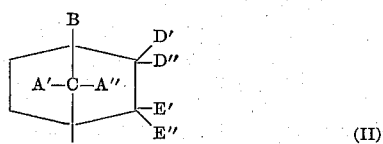
(II)

wherein:

A' and A" are substituents selected from within the group consisting of a hydrogen atom and a methyl radical;

B, D' and D" are substituents selected from within the group consisting of a hydrogen atom, a methyl radical and amino radical;

E' and E" are substituents selected from within the group consisting of a hydrogen atom, a halogen atom, a lower alkyl radical having not more than 4 carbon atoms, and amino radical;

with one of the substituents B, D', D", E' and E" being an amino radical and at least another of said substituents B, D', D", E' and E" being other than H when A' and A" are H.

The invention also includes the salts of the above compounds.

The method of preparing the compounds of the invention comprises reacting a dicyclo-amine of the above Formula II wherein the various substituents are the same as specified above in connection with said formula, with a sulfonyl derivative of the formula:

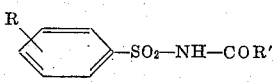

wherein R' represents a radical selected from within the group consisting of an ethoxy radical —OC$_2$H$_5$ and an NH$_2$ amino group, and R has the same meaning as earlier specified; the reaction is performed in a suitable organic solvent at a temperature depending mainly on the solvent used.

In a first specific example, compounds according to the invention can be produced by reacting a substituted arylsulphonyl-urethane with a suitably selected dicyclo-amine in the presence of dimethyl formamide with agitation at a temperature of about from 70 to 110° C.

In a second specific example, a substituted aryl-sulfonyl-urethane can be reacted with the appropriate dicyclo-amine in toluene under reflux conditions.

The compounds of the invention can also be prepared by reacting a substituted aryl-sulfonyl-urea with the appropriate dicyclo-amine in the presence of chlorobenzene with agitation under reflux, with release of ammonia gas.

Certain details involved in the procedures used according to this invention may be obtained from the following publications: Marshall & al., Journal Org. Chem., 23, 927, 1958 and Journal of Med. & Pharm. Chem., Vi, 160, 1963, and S. J. Das Gupta, Journal Ind. Chem. Soc., 38.7, 417, 1961. The procedures described in the above publications have been used, in part, in the methods of preparing the compounds of the invention.

The necessary ingredients for carrying out the above reactions are available on the market and/or preparable by well-known methods. Thus, the aryl-sulfonylureas used as the starting compounds may be prepared as described by Marshall & al. (of supra). The sulfonylureas used in the alternative procedure can be synthesized by the method described by S. J. Das Gupta, supra.

In connection with the method of preparation of the compounds of the invention, the following points are underlined:

To prepare substituted amino-arylsulfonylureas, the corresponding intermediate compound acetylamino-arylsulfonylurea, is heated at reflux for 2 hours with a 4 N solution of KOH, then poured into water and neutralized with 4 N solution of hydrochloric acid. The precipitate is drained dry and recrystallized from isopropanol.

The preparation of the suitable dicycloamines is described in the available literature. The following publications are indicated:

1,7,7-trimethyl 2-amino 2,2,1-dicycloheptane is prepared from the corresponding oxime as described by Lespagnol et al. in Bull. Soc. Chim. de Lille 31 (1954), and 1-amino 7,7-dimethyl 2,2,1-dicyclo heptane is obtained from 7,7-dimethyl 2,2,1- dicyclo 1-heptyl carboxylic acid as described by W. R. Boehme et al. in Journal of Med. and Pharm. Chem., Nr. 1, 199, 1961. 2-amino 2,2,1-dicyclo heptane was prepared from the corresponding oxime as described by Chilouet in his thesis, Paris, 1936. 2,2,3-trimethyl 3-amino 2,2,1-dicyclo heptane is synthesized from camphene as described by Stone et al., in Journal of Med. & Pharm. Chem. v., 4, 680, 1962. 2-amino 3,3-dimethyl 2,2,1-dicyclo heptane and 1,7,7-trimethyl 2-amino 3-ethyl 2,2,1-dicyclo heptane are prepared from the corresponding oximes as per Kompra in Ann., 366, 71, 1909, and Lespagnol (cf. supra).

The compounds of the invention may, of course, be readily obtained in the form of their salts with bases compatible in regard to the applications contemplated. Among the bases that may be used, sodium hydroxide, potassium hydroxide, ammonium hydroxide, diethanolamine, triethanolamine, and the like, may be mentioned.

Some examples of practical procedures from preparing compounds in accordance with the invention are described below for purposes of illustration but not of limitation. In the examples, all parts are given by weight. Melting points are determined by the Köfler test.

*Example 1.—N-(4-chlorobenzenesulfonyl)-N'-[3-(2,2,3-trimethyl 2,2,1)-dicyclo-heptyl] urea*

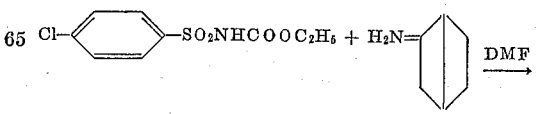

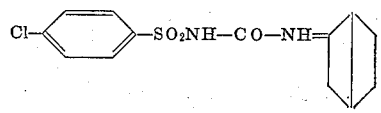

A mixture of 13.2 parts 4-chlorobenzenesulfonyl urethane and 7.6 parts 2,2,3-trimethyl 3-amino 2,2,1-dicyclo heptane and 13 ml. dimethyl formamide is agitated, then heated at 70° C. for 1½ hours, and then carried to a temperature of 110° C. for 1½ hours.

The reaction mixture is isolated and poured into 500 ml. water in which agitation is maintained. The precipitate is filtered then dried in an oven in a vacuum at 55° C. Recrystallization from an ethanol-water mixture gave 9 parts of a product melting at 206–207° C.

Using a similar procedure the following compounds were produced with a good yield:

N-(4-chlorobenzene sulfonyl) N'-[2-(1,7,7-trimethyl 2,2,1-dicyclo)-heptyl] urea, M.P. 200° C. (ethanol)

N-(4-acetylbenzenesulfonyl)-N'-[3-(2,2,3-trimethyl 2,2,1-dicyclo)-heptyl] urea, M.P. 190–192° C. (toluene)

N-(4-chlorobenzene sulfonyl)-N'-[2-(1,7,7-trimethyl 3-ethyl 2,2,1-dicyclo)heptyl] urea N-(4-chlorobenzyl sulfonyl)-N'-[2-(1,7,7-trimethyl 3-ethyl 2,2,1-dicyclo)-heptyl] urea, M.P. 170–171° C. (isopropanol)

N-(4-methoxybenzene sulfonyl)-N'-[3-(2,2,3-trimethyl 2,2,1-dicyclo)-heptyl] urea, M.P. 169° C. (isopropanol)

N-(4-acetylaminobenzenesulfonyl)-N'-[3-(2,2,3-trimethyl 2,2,1-dicyclo)-heptyl] urea, converted into N-(4-aminobenzene sulfonyl)-N'-[3-(2,2,3-trimethyl 2,2,1-dicyclo)-heptyl] urea, M.P. 197–198° C. (isopropanol-water).

N-(4-acetylaminobenzene sulfonyl)-N'[2-(2,2,1-dicyclo) heptyl] urea, converted into N-(4-aminobenzene sulfonyl)-N'[2-(2,2,1-dicyclo) heptyl] urea, M.P. 216–217° C. (isopropanol).

N-(4-acetylaminobenzenesulfonyl)-N'[2-(1,7,7-trimethyl 2,2,1-dicyclo) heptyl] urea, converted into N-(4-aminobenzenesulfonyl)-N'-[2-(1,7,7-trimethyl 2,2,1-dicyclo)heptyl] urea, M.P. 230° C. (isopropanol).

The amino-compounds were prepared from the acetylamino compounds by the successive action of 4 N KOH at reflux, and 4 N HCl, as described in the beginning of the specification.

*Example 2.—N-(4-acetylbenzenesulfonyl)-N'-[2-(1,7,7-trimethyl 2,2,1-dicyclo)heptyl] urea*

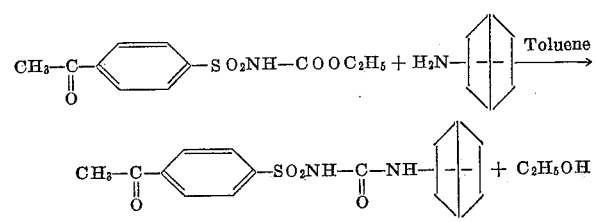

To a suspension containing 13.6 parts 4-acetylbenzenesulfonyl urethane and 50 ml. toluene, are rapidly added 7.6 parts 1,7,7-trimethyl 2-amino 2,2,1-dicyclo heptane in 30 ml. toluene. Within a few minutes the mixture is converted into a solution. The reaction mixture is heated at reflux for 1½ hours. The resulting clear solution crystallises on cooling. The crystals are filtered, then recrystallized from toluene. There are obtained 13.5 parts of a product, M.P. 196–197° C.

By a similar procedure the following sulfonylurea compounds were obtained:

N-(4-methoxybenzenesulfonyl)-N'-[2-(3,3-dimethyl 2,2,1-dicyclo)heptyl] urea, M.P. 176–177° C. (ethanol)

N-(4-ethoxybenzene sulfonyl)-N'-[2-(1,7,7-trimethyl 2,2,1-dicyclo)heptyl] urea, M.P. 168–170° C. (isopropanol)

N-(4-ethoxybenzenesulfonyl)-N'-[3-(2,2,3-trimethyl 2,2,1-dicyclo)heptyl] urea, M.P. 175–176° C. (toluene)

N-(4-methoxybenzenesulfonyl)-N'-[1-(7,7-dimethyl 2,2,1-dicyclo)heptyl] urea, M.P. 198° C. (toluene)

N-(4-fluorobenzenesulfonyl)-N'-[2,2,3,3-trimethyl(2,2,1-dicyclo)heptyl] urea, M.P. 169–170° C. (ethanol-water)

N-(4-fluorobenzenesulfonyl)-N'-[2-(1,7,7-trimethyl 2,2,1-dicyclo)heptyl)] urea, M.P. 195–196° C. (ethanol-water)

N-(4-fluorobenzenesulfonyl)-N'-[3-(2,2,3-trimethyl 2,2,1-dicyclo)heptyl] urea, M.P. 169–170° C. (ethanol-water).

*Example 3.—N-(4-ethylbenzenesulfonyl)-N'-[2-(1,7,7-trimethyl 2,2,1-dicyclo)heptyl] urea*

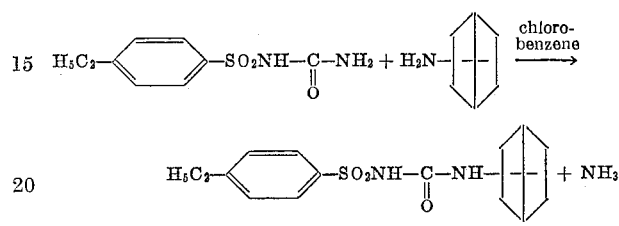

A suspension containing 22.8 parts 4 N ethylbenzenesulfonylurea and 18.3 parts 1,7,7-trimethyl 2-amino 2,2,1-dicyclo heptane is mixed with 500 ml. chlorobenzene and heated under continued stirring. At reflux temperature the ammonia solution has evaporated and a clear solution remains. After heating one hour, the reaction mixture is cooled and the solvent removed by distillation in vacuo. The residue is recrystallized from cyclohexane. The melting point is 151° C.

Using a similar procedure, the compound N-(4-isopropylbenzenesulfonyl) - N' - [2 - (1,7,7 - trimethyl 2,2,1-dicyclo)heptyl] urea, M.P. 139° C., was prepared.

The compounds of the invention, as well as those of their salts and bases as are therapeutically acceptable, have been found to constitute desirable hypo-glycemic agents. Tests performed on animals including mice, rats, rabbits and dogs, have proved them to lower the sugar rate in the blood.

Preliminary clinical tests have shown that the compounds of the invention can be given to patients suffering from diabetes and have successfully overcome the unbalance in glucidic metabolism.

A thorough pharmacological investigation of the compounds has given the following results:

Acute toxicity has been determined for the mouse and rat. $LD_{50}$ varies within the range from 2.50 to 12 g./kg. per os, depending on the compound. This toxicity is relatively low. By way of comparison, the convention hypoglycemic agents chloropropamide and tobutamide have $DL_{50}$ values of 1.60 g./kg. and 2.50 g./kg. respectively.

The hypoglycemic activity was determined for the rabbit and rat, and in regard to some of the compounds additionally for the dog and mouse. It was found that the effective dose for inducing a drop of 5 to 70% in the blood sugar rate varies over the range from 50 to 250 mg./kg. per os, depending on the compound used. Thus the safety margin is seen to be very large. The resulting hypoglycemic condition is lasting, its duration being from 7 to 28 hours.

When the compounds of the invention are given to human subjects suffering from diabetes, a good regulation of the disorders in glucidic metabolism is observed, as well as a rapid normalization of the sugar blood and disappearance of glycosurea. The doses that were used and were found to be best suited were in the range of from 0.10 to 1.0 g.

By way of example, the compound N-(4-acetylbenzenesulfonyl) - N' - (2 - (1,7,7 - trimethyl 2,2,1 - dicyclo) heptyl) urea was administered to diabetic subjects in doses of from 200 to 600 mg. per os, per diem. The patients recovered their glycemic balance after 3 or 4 days and this condition was thereafter maintained by the administration of lower doses of the compound.

Tolerance was found to be excellent, and no digestive disorders were observed. Biological examination including urine analysis, blood formula, urea, liver tests, after the treatment, resulted in no abnormal finding.

What we claim is:

1. A chemical compound having a formula selected from the group consisting of

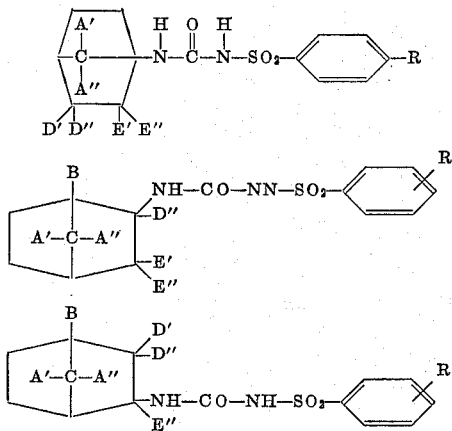

wherein:

R is a substituent selected from the group consisting of halogen atom, lower alkyl radical containing from 2 to 4 carbon atoms, lower alkoxy radical containing from 1 to 5 carbon atoms, amino radical and acetyl radical, A and A' are substituents selected from the group consisting of hydrogen atom and methyl radical, B, D' and D" are substituents selected from the group consisting of hydrogen atom and methyl radical and E' and E" are substituents selected from the group consisting of hydrogen atom, halogen atom and lower alkyl radical having not more than 4 carbon atoms, one of said substituents B, D', D", E' and E" being other than hydrogen atom when A and A' are hydrogen atoms, and acid addition salts of such compounds.

2. N-(4-chlorobenzenesulfonyl) - N' - (3 - (2,2,3-trimethyl 2,2,1)-dicyclo-heptyl) urea.

3. N-(4-chlorobenzenesulfonyl) - N' - (2-(1,7,7 - trimethyl 2,2,1-dicyclo)heptyl) urea.

4. N-(4-acetylbenzenesulfonyl) - N' - (3 - (2,2,3-trimethyl 2,2,1-dicyclo)-heptyl) urea.

5. N-(4-methoxybenzylsulfonyl) - N' - (2 - (1,7,7-trimethyl 3-ethyl 2,2,1-dicyclo)-heptyl) urea.

6. N-(4-methoxybenzenesulfonyl)-N'-(3-(2,2,3-trimethyl 2,2,1-dicyclo)-heptyl) urea.

7. (4-aminobenzenesulfonyl) - N' - (3-(2,2,3-trimethyl 2,2,1-dicyclo)-heptyl) urea.

8. N-(4-aminobenzenesulfonyl) - N' - (2 - (1,7,7-trimethyl 2,2,1-dicyclo)-heptyl) urea.

9. N-(4-acetylbenzenesulfonyl) - N' - (2 - (1,7,7-trimethyl 2,2,1-dicyclo)-heptyl) urea.

10. N-(4-methoxybenzenesulfonyl) - N' - (2-(1,7,7-dimethyl 2,2,1-dicyclo)-heptyl) urea.

11. N-(4-fluorobenzenesulfonyl) - N' - (3 - (2,2,3-trimethyl 2,2,1-dicyclo)-heptyl) urea.

12. N-(4-ethylbenzenesulfonyl) - N' - (2 - (1,7,7,-trimethyl 2,2,1-dicyclo)-heptyl) urea.

13. N-(4-isopropylbenzenesulfonyl)-N'-(2 - (1,7,7-trimethyl 2,2,1-dicyclo)-heptyl) urea.

References Cited

UNITED STATES PATENTS

| | | | |
|---|---|---|---|
| 2,762,842 | 9/1956 | Hafliger | 260—553 |
| 2,928,871 | 3/1960 | Aeschlimann et al. | 260—553 |
| 3,048,519 | 8/1962 | Fedrick | 167—51.5 |
| 3,072,527 | 1/1963 | Cohen | 167—51.5 |
| 3,072,720 | 1/1963 | Wright | 260—553 |
| 3,136,814 | 6/1964 | Irikura et al. | 260—553 |
| 3,155,721 | 11/1964 | Mills et al. | 260—553 |
| 3,202,680 | 8/1965 | Korger et al. | 260—553 |
| 3,214,467 | 10/1965 | Haack et al. | 260—553 |

FOREIGN PATENTS 618,512  12/1962  Belgium.

OTHER REFERENCES

Royals: Advanced Organic Chemistry, pages 241–245, Prentice-Hall, Inc., Engelwood Cliffs, N.J. (1954).

Whitmore: Organic Chemistry, pages 663 to 671, D. Van Nostrand Co., Inc., New York, third printing (1938).

Gerzon: J. Med. Chem., vol. 6, page 670 (1963).

JOHN D. RANDOLPH, *Primary Examiner.*

FRANK CACCIAPAGLIA, JR., *Examiner.*

P. L. SABATINE, *Assistant Examiner.*